United States Patent
Braylovskiy et al.

(10) Patent No.: US 9,825,714 B1
(45) Date of Patent: Nov. 21, 2017

(54) APPARATUS, SYSTEM, AND METHOD FOR REDUCING ELECTROMAGNETIC INTERFERENCE IN REDUNDANT POWER SYSTEMS

(71) Applicant: Juniper Networks, Inc., Sunnyvale, CA (US)

(72) Inventors: Michael Braylovskiy, San Mateo, CA (US); Jaspal S. Gill, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1156 days.

(21) Appl. No.: 13/949,096

(22) Filed: Jul. 23, 2013

(51) Int. Cl.
*H02J 1/02* (2006.01)
*H01F 17/04* (2006.01)
*H04B 15/00* (2006.01)
*H01F 41/00* (2006.01)
*H02J 1/00* (2006.01)

(52) U.S. Cl.
CPC ........... *H04B 15/005* (2013.01); *H01F 41/00* (2013.01); *H02J 1/00* (2013.01)

(58) Field of Classification Search
CPC ..... H04B 15/00; H04B 15/005; H01F 27/343; H01F 17/045
See application file for complete search history.

(56) References Cited

U.S. PATENT DOCUMENTS

| | | | |
|---|---|---|---|
| 2006/0181398 A1* | 8/2006 | Martich | H04L 12/66 340/538 |
| 2011/0151717 A1* | 6/2011 | Ge | H01R 13/6658 439/620.07 |
| 2014/0266507 A1* | 9/2014 | Fauer | H02M 1/10 333/181 |

* cited by examiner

*Primary Examiner* — Rexford Barnie
*Assistant Examiner* — Thai Tran
(74) *Attorney, Agent, or Firm* — FisherBroyles, LLP

(57) ABSTRACT

An apparatus for reducing electromagnetic interference in redundant power systems may include an inductor capable of being electrically coupled between first and second power sources and an electrical load. The apparatus may also include a first return-current path that electrically couples a return terminal of the electrical load to a return terminal of the first power source. The first return-current path may include a winding wound around a core of the inductor. The apparatus may further include a second return-current path that electrically couples the return terminal of the electrical load to a return terminal of the second power source. The second return-current path may include a winding wound around the core of the inductor. Various other apparatuses, systems, and methods are also disclosed.

16 Claims, 12 Drawing Sheets

APPARATUS, SYSTEM, AND METHOD FOR REDUCING ELECTROMAGNETIC INTERFERENCE IN REDUNDANT POWER SYSTEMS

BACKGROUND

ElectroMagnetic Interference (EMI) may potentially impair the reliability and/or performance of telecommunications equipment. In an effort to prevent this impairment, telecommunications equipment manufacturers may incorporate EMI filters (such as common-mode chokes and/or capacitors) to reject EMI at the equipment's input power feeds. Unfortunately, traditional EMI filters may be unable to properly reject EMI created by telecommunications equipment under certain conditions.

For example, a telecommunications device powered by redundant Direct Current (DC) power sources may include traditional common-mode chokes intended to reduce the EMI at the device's input power feeds. In the event that these redundant DC power sources have a common ground, differing amounts of current may flow through the individual windings of each traditional common-mode choke. These differing amounts of current flow may induce unbalanced magnetic flux that creates magnetizing current capable of saturating the traditional choke's core. Unfortunately, once the core reaches saturation, the traditional common-mode choke may no longer be able to provide sufficient inductance to reduce the EMI to an acceptable level for the telecommunications device, thereby potentially causing the telecommunications device to malfunction.

The instant disclosure, therefore, identifies and addresses a need for improved apparatuses, systems, and methods for reducing EMI in redundant power systems.

SUMMARY

As will be described in greater detail below, the instant disclosure generally relates to apparatuses, systems, and methods for reducing EMI in redundant power systems. In one example, an apparatus for reducing EMI in redundant power systems may include an inductor capable of being electrically coupled between first and second power sources and an electrical load. The apparatus may also include a first return-current path that electrically couples a return terminal of the electrical load to a return terminal of the first power source. The first return-current path may include a winding wound around a core of the inductor. The apparatus may further include a second return-current path that electrically couples the return terminal of the electrical load to a return terminal of the second power source. The second return-current path may also include a winding wound around the core of the inductor.

As another example, a method for reducing EMI in redundant power systems may include electrically coupling an inductor with a core between first and second power sources and an electrical load. The method may also include establishing at least a portion of a first return-current path that electrically couples a return terminal of the electrical load to a return terminal of the first power source. The first return-current path may include a winding wound around a core of the inductor. The method may further include establishing at least a portion of a second return-current path that electrically couples the return terminal of the electrical load to a return terminal of the second power source. The second return-current path may include a winding wound around the core of the inductor.

Similarly, a system for reducing EMI in redundant power systems may include first and second power sources that provide redundant power to an electrical load. The system may also include an EMI filter electrically coupled between the first and second power sources and the electrical load. The EMI filter may include an inductor with a core and a first return-current path that electrically couples a return terminal of the electrical load to a return terminal of the first power source. The first return-current path may include a winding wound around the core of the inductor. The EMI filter may also include a second return-current path that electrically couples the return terminal of the electrical load to a return terminal of the second power source. The second return-current path may include a winding wound around the core of the inductor.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
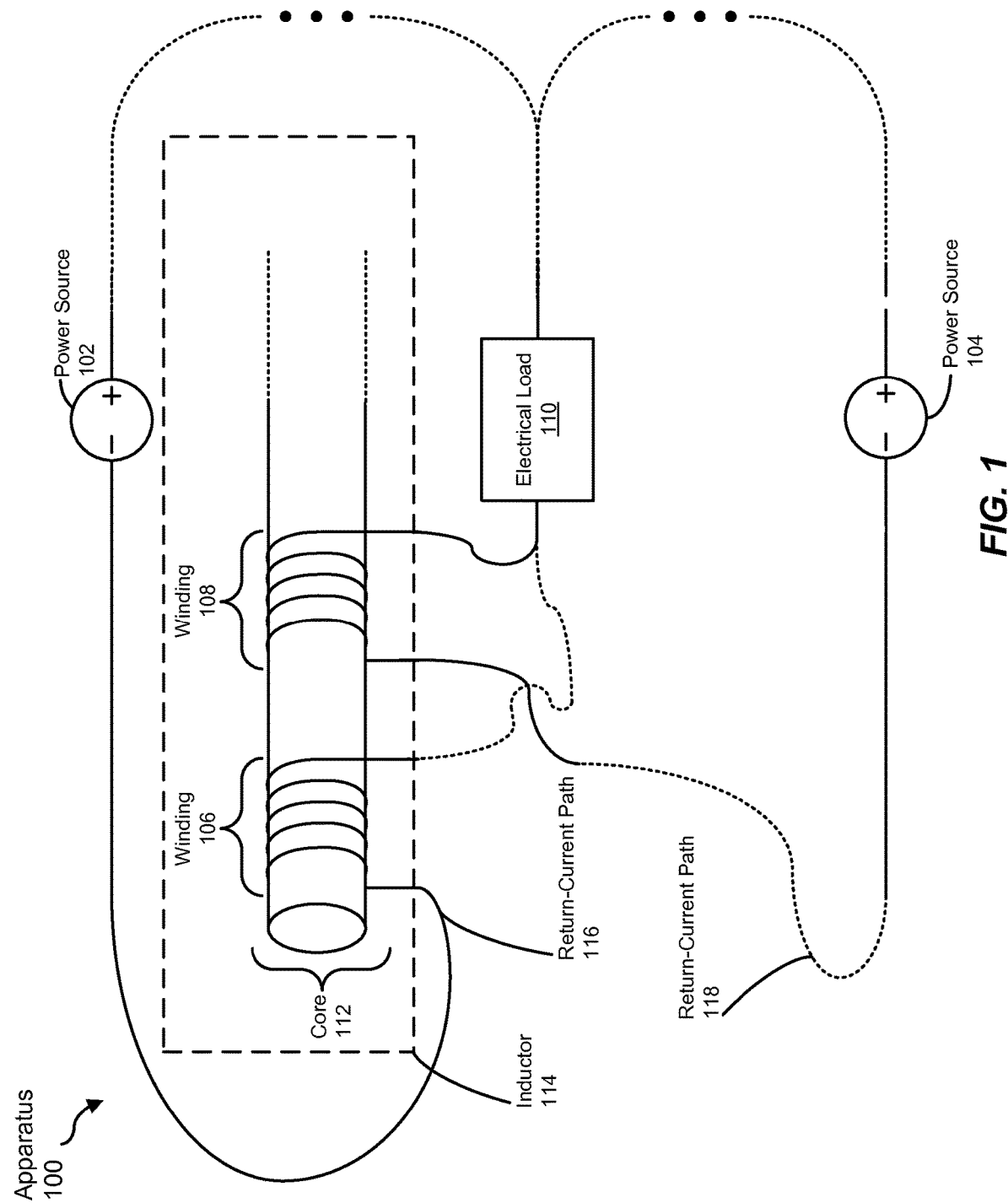
FIG. 1 is a block diagram of an exemplary apparatus for reducing EMI in redundant power systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for reducing EMI in redundant power systems. As will be explained in greater detail below, embodiments of the instant disclosure may balance the magnetic flux induced by inductors that reject EMI in redundant power systems. In other words, these embodiments may enable the magnetic flux induced by the individual windings of each inductor to collectively offset one another such that the inductor avoids creating magnetizing current that saturates the inductor's core.

By enabling the magnetic flux induced by the individual windings of each inductor to collectively offset one another, embodiments of the instant disclosure may facilitate the usage of high magnetic permeability material (such as ferromagnetic material) in the inductor's core without the risk of saturation. Moreover, by facilitating the usage of high magnetic permeability material in the inductor's core without the risk of saturation, these embodiments may enable the inductors to achieve higher inductance within smaller physical dimensions. As a result, these embodiments may help to reduce the amount of circuit board area needed to accommodate EMI filters, improve air cooling, and/or increase the reliability of electrical equipment (such as telecommunications devices) powered by redundant power sources.

The following will provide, with reference to FIGS. 1-10, examples of inductor-based components and circuit configurations that may facilitate reducing EMI in redundant power systems. The discussion corresponding to FIG. 11 will provide a detailed description of an exemplary method for reducing EMI in redundant power systems. Finally, the discussion corresponding to FIG. 12 will provide numerous examples of systems that may include the components and circuits shown in FIGS. 1-10.

FIGS. 1-10 show block diagrams of an exemplary apparatus 100 for reducing EMI in redundant power systems. Apparatus 100 may include an inductor 114. The term "inductor," as used herein, generally refers to any type or form of electrical component that resists changes in electrical current flow due to the component's inductance. The term "inductance," as used herein, generally refers to any type or form of property or attribute that causes a conductor (in, e.g., an electrical component or circuit) to induce an electromotive force in response to a change in electrical current flow. Examples of inductor 114 include, without limitation, common-mode inductors, common-mode chokes, magnetic core inductors, ferromagnetic core inductors, laminated core inductors, toroidal inductors, coupled inductors, multi-layer inductors, steel core inductors, Radio Frequency (RF) inductors, power inductors, shielded inductors, wirewound inductors, switch-mode inductors, honeycomb coils, spiderweb coils, combinations of one or more of the same, or any other suitable type or form of inductor.

FIG. 1 shows that inductor 114 may include a core 112. The term "core," as used herein, generally refers to any type or form of material around which an inductor is wound. In some examples, core 112 may include magnetic material. Examples of core 112 include, without limitation, ferromagnetic cores, iron cores, ferrite cores, steel cores, silicon steel cores, nickel cores, alloy cores, permalloy cores, combinations of one or more of the same, or any other suitable type or form of core.

As shown in FIG. 1, apparatus 100 may also include return-current paths 116 and 118. The phrase "return-current path," as used herein, generally refers to any type or form of electrical path that facilitates the flow of electrical current from an electrical load to a power source in a closed circuit. In some examples, return-current paths 116 and 118 may each represent at least a portion of a redundant power circuit that includes an electrical load 110 redundantly powered by power sources 102 and 104. In these examples, return-current path 116 may electrically couple a return terminal of electrical load 110 to a return terminal of power source 102 (e.g., the negative terminal of power source 102). Accordingly, return-current path 116 may facilitate the flow of electrical current from electrical load 110 to power source 102.

Similarly, return-current path 118 may electrically couple a return terminal of electrical load 110 to a return terminal of power source 104 (e.g., the negative terminal of power source 104). Accordingly, return-current path 116 may facilitate the flow of electrical current from electrical load 110 to power source 104. The phrases "return terminal" and "negative terminal," as discussed herein with reference to a power source, may refer to the same terminal of the power source. As a result, these phrases may be used interchangeably throughout the instant disclosure for purposes of simplicity and readability.

Return-current paths 116 and 118 may each include at least one winding (sometimes also referred to as a coil). For example, return-current path 116 may include a winding 106 wound around core 112 of inductor 114. Similarly, return-current path 118 may include a winding 108 wound around core 112 of inductor 114. The term "winding," as used herein, generally refers to any type or form of conductor (such as a wire) that is wound around a core.

In some examples, windings 106 and 108 may each have the same number of turns. As a result, windings 106 and 108 may each have approximately the same level of inductance. For example, windings 106 and 108 may each include 10 turns of insulated copper wire wound around core 112. In this example, windings 106 and 108 may each provide approximately 5 microhenries of inductance.

In some examples, windings 106 and 108 may each be wound around core 112 in the same direction. For example, windings 106 and 108 may each be wound around core 112 in a clockwise direction starting from one end of core 112 and heading toward the other end of core 112. Alternatively, windings 106 and 108 may each be wound around core 112 in a counterclockwise direction starting from the one end of core 112 and heading toward the other end of core 112.

Power sources 102 and 104 may provide redundant DC power to electrical load 110. The term "power source," as used herein, generally refers to any type or form of device capable of providing electrical power to an electrical load. Examples of power sources 102 and 104 include, without limitation, DC power supplies, batteries, linear regulated power supplies, switch-mode power supplies, programmable power supplies, uninterruptible power supplies (UPSes), combinations of one or more of the same, or any other suitable type or form of power sources.

Electrical load 110 may include a single device or a variety of devices. In some examples, electrical load 110 may need substantially continuous power to provide one or more functions with a high degree of reliability. Examples of electrical load 110 include, without limitation, power supplies, telecommunications devices, system cards, network hubs, gateways, switches, bridges, routers, servers, computing devices, combinations of one or more of the same, or any other suitable type or form of electrical load.

As will be described in greater detail below, apparatus 100 may be implemented in a variety of ways and/or include a variety of additional electrical components not illustrated in FIG. 1. For example, return-current path 116 may include an active ORing device (not illustrated in FIG. 1) electrically coupled between winding 106 and the negative terminal of power source 102. Additionally or alternatively, return-current path 118 may include an active ORing device (not illustrated in FIG. 1) electrically coupled between winding 108 and the negative terminal of power source 104. Such ORing devices may enable electrical current to flow toward the negative terminal of power sources 102 and 104 via return-current paths 116 and 118 but impede the flow of electrical current in the reverse direction.

Figure 2:
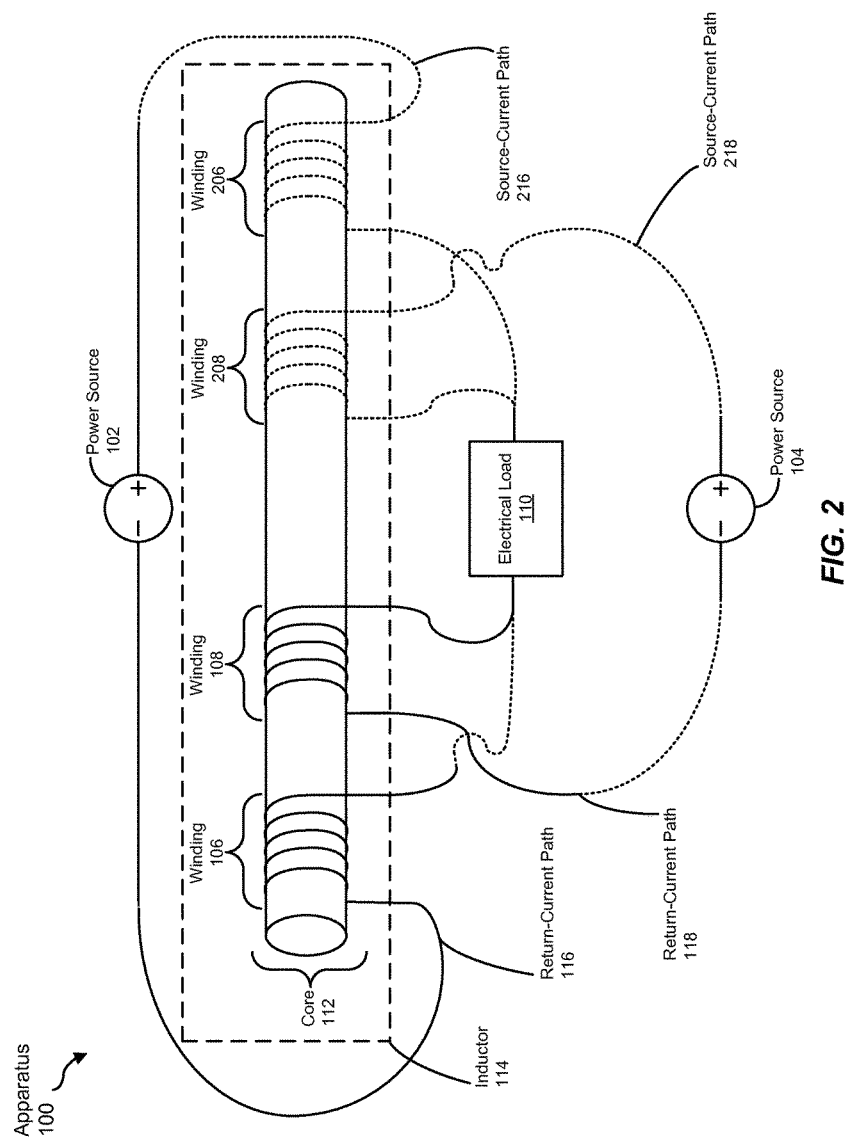
FIG. 2 is a block diagram of an exemplary apparatus for reducing EMI in redundant power systems.

FIG. 2 shows that apparatus 100 may also include source-current paths 216 and 218. The phrase "source-current path," as used herein, generally refers to any type or form of electrical path that facilitates the flow of electrical current from a power source to an electrical load in a closed circuit. In some examples, source-current path 216 may electrically couple a source terminal of power source 102 (e.g., the positive terminal of power source 102) to a source terminal of electrical load 110. In these examples, source-current path 216 may facilitate the flow of electrical current from power source 102 to electrical load 110.

Similarly, source-current path 218 may electrically couple a source terminal of power source 104 (e.g., the positive terminal of power source 104) to a source terminal of electrical load 110. Accordingly, source-current path 218 may facilitate the flow of electrical current from power source 104 to electrical load 110. The phrases "source terminal" and "positive terminal," as discussed herein with reference to a power source, may refer to the same terminal of the power source. As a result, these phrases may be used interchangeably throughout the instant disclosure for purposes of simplicity and readability.

Source-current paths 216 and 218 may each include at least one winding. For example, source-current path 216 may include a winding 206 wound around core 112 of inductor 114. Similarly, source-current path 218 may include a winding 208 wound around core 112 of inductor 114.

In some examples, windings 206 and 208 may each have the same number of turns as windings 106 and 108. As a result, windings 206 and 208 may each have approximately the same level of inductance as windings 106 and 108. For example, windings 106, 108, 206, and 208 may each include 5 turns of insulated copper wire wound around core 112. In this example, windings 106, 108, 206, and 208 may each provide approximately 5 microhenries of inductance.

In some examples, windings 206 and 208 may each be wound around core 112 in the same direction as windings 106 and 108. For example, windings 106, 108, 206, and 208 may each be wound around core 112 in a clockwise direction starting from one end of core 112 and heading toward the other end of core 112. Alternatively, windings 106 and 108 may each be wound around core 112 in a counterclockwise direction starting from the one end of core 112 and heading toward the other end of core 112.

Figure 3:
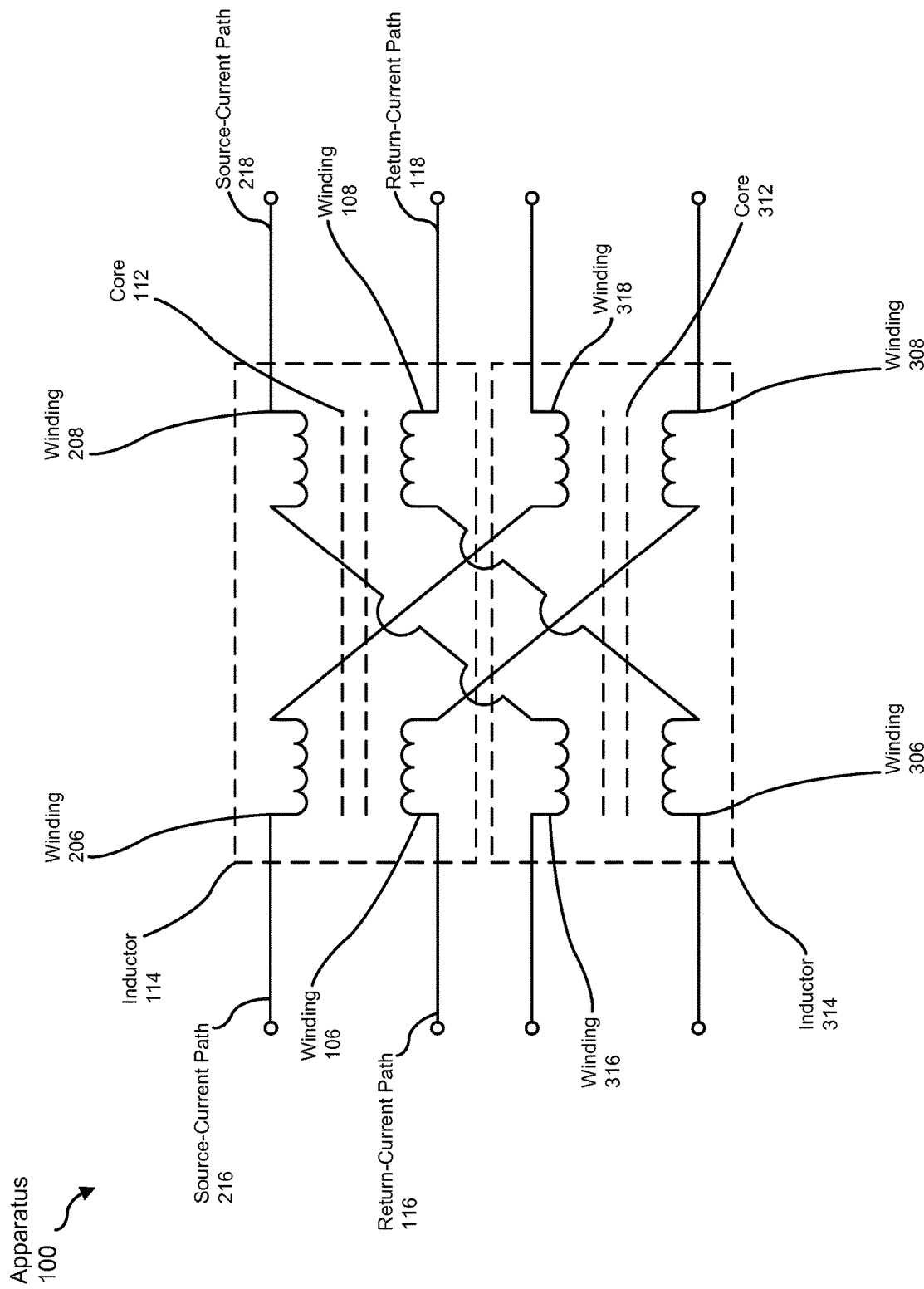
FIG. 3 is a block diagram of an exemplary apparatus for reducing EMI in redundant power systems.

FIG. 3 shows a schematic of apparatus 100 being implemented in a configuration that includes an additional inductor 314. As shown in FIG. 3, inductor 314 may include a core 312. FIG. 3 also shows that return-current paths 116 and 118 and source-current paths 216 and 218 may each include an additional winding. For example, return-current path 116 may include winding 106 wound around core 112 of inductor 114 as well as winding 308 wound around core 312 of inductor 314. In this example, return-current path 118 may include winding 108 wound around core 112 of inductor 114 as well as winding 306 wound around core 312 of inductor 314.

Similarly, source-current path 216 may include winding 206 wound around core 112 of inductor 114 as well as winding 318 wound around core 312 of inductor 314. In addition, source-current path 218 may include winding 208 wound around core 112 of inductor 114 as well as winding 316 wound around core 312 of inductor 314.

Figure 4:
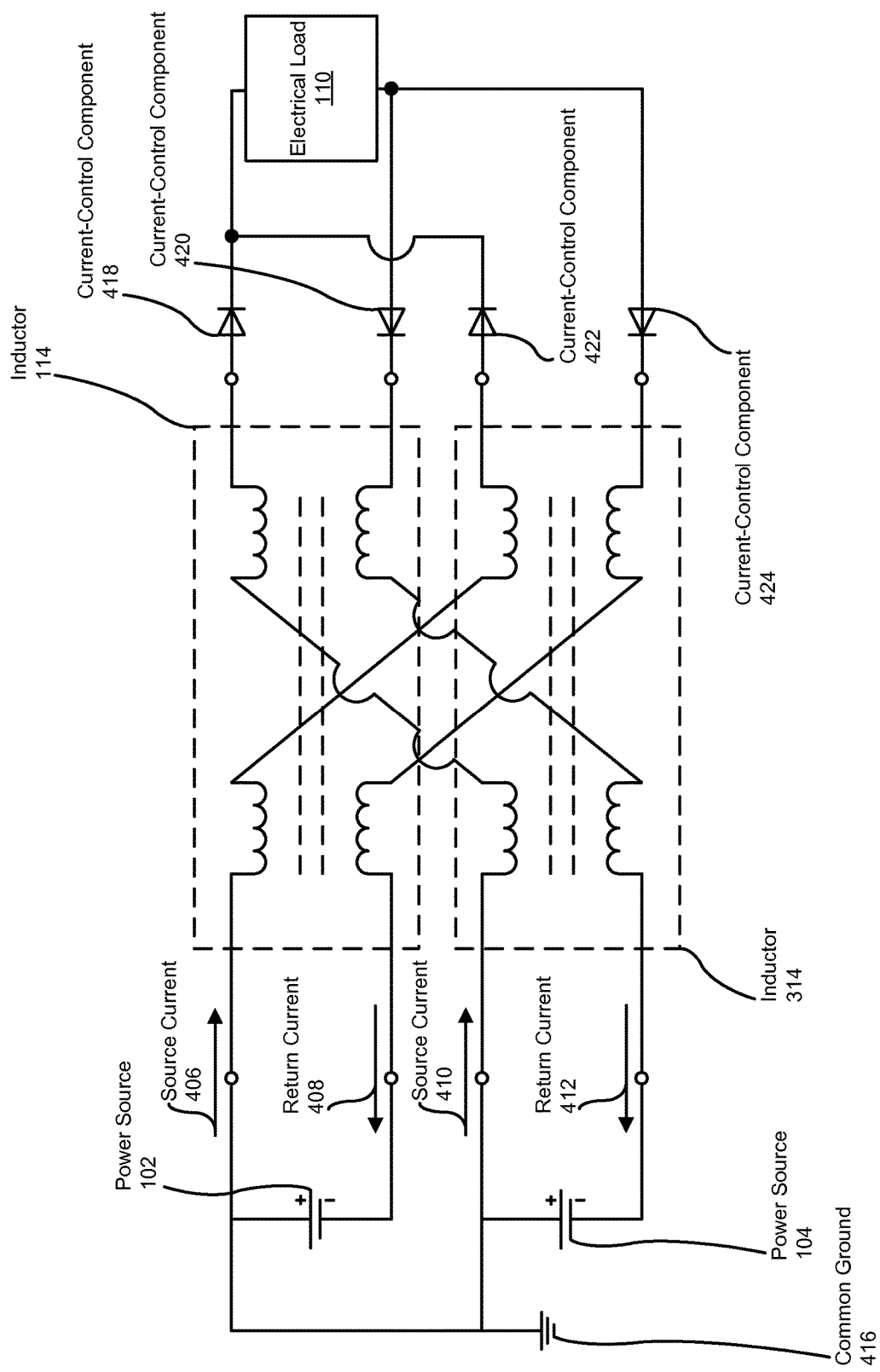
FIG. 4 is a block diagram of an exemplary redundant power system that includes an apparatus for reducing EMI.

FIG. 4 shows a schematic of an exemplary redundant power system that includes apparatus 100 in the configuration shown in FIG. 3. As shown in this schematic, power source 102 may provide source current 406 to electrical load 110 via source-current path 216 that includes windings 206 and 318. Similarly, power source 104 may provide source current 410 to electrical load 110 via source-current path 218 that includes windings 208 and 316. The phrase "source current," as used herein, generally refers to any type or form of electrical current that flows from a power source to an electrical load via a source-current path.

In addition, power source 102 may receive return current 408 from electrical load 110 via return-current path 116 that includes windings 106 and 308. Similarly, power source 104 may receive return current 412 from electrical load 110 via return-current path 118 that includes windings 108 and 306. The phrase "return current," as used herein, generally refers to any type or form of electrical current that flows from an electrical load to a power source via a return-current path.

In the redundant power system shown in FIG. 4, power sources 102 and 104 may be grounded by a common ground 416. The term "common ground," as used herein, generally refers to any type or form of reference point for voltage levels within a closed circuit. In one example, common ground 416 may represent a circuit node shared by both of power sources 102 and 104. Additionally or alternatively, common ground 416 may represent Earth ground.

Since, in the example shown in FIG. 4, power sources 102 and 104 are each grounded by common ground 416 at their positive terminal, power sources 102 and 104 may be configured in reverse polarity. For example, power source 102 may cause a voltage drop of −54 volts relative to common ground 416. In other words, assuming that the positive terminal of power source 102 represents 0 volts due to common ground 416, the negative terminal of power source 102 may measure −54 volts relative to common ground 416.

In some examples, power sources 102 and 104 may cause differing voltage drops relative to common ground 416. Continuing with the above example, power source 102 may cause a voltage drop of −54 volts relative to common ground 416. In contrast, power source 104 may cause a voltage drop of −48 volts relative to common ground 416.

FIG. 4 also shows that this redundant power system may include current-control components 418, 420, 422, and 424. The phrase "current-control component," as used herein, generally refers to any type or form of electrical component that enables electrical current to flow in a forward direction but impedes the flow of electrical current in a reverse direction. Examples of current-control components 418, 420, 422, and 424 include, without limitation, diodes, active ORing devices, transistors (such as Meta l-Oxide-Semiconductor Field-Effect Transistors (MOSFETs)), combinations of one or more of the same, or any other suitable type or form of current-control components.

Current-control component 418 may be electrically coupled between winding 208 and the source terminal of electrical load 110. Current-control component 418 may prevent source current 406 from flowing away from electrical load 110 toward power source 102. Similarly, current-control component 422 may be electrically coupled between winding 318 and the source terminal of electrical load 110. Current-control component 422 may prevent source current 410 from flowing away from electrical load 110 toward power source 104.

In addition, current-control component 420 may be electrically coupled between winding 108 and the return terminal of electrical load 110. Current-control component 420 may prevent return current 408 from flowing away from power source 102 toward electrical load 110. Similarly, current-control component 424 may be electrically coupled between winding 308 and the return terminal of electrical load 110. Current-control component 424 may prevent return current 412 from flowing away from power source 104 toward electrical load 110.

Figure 5:
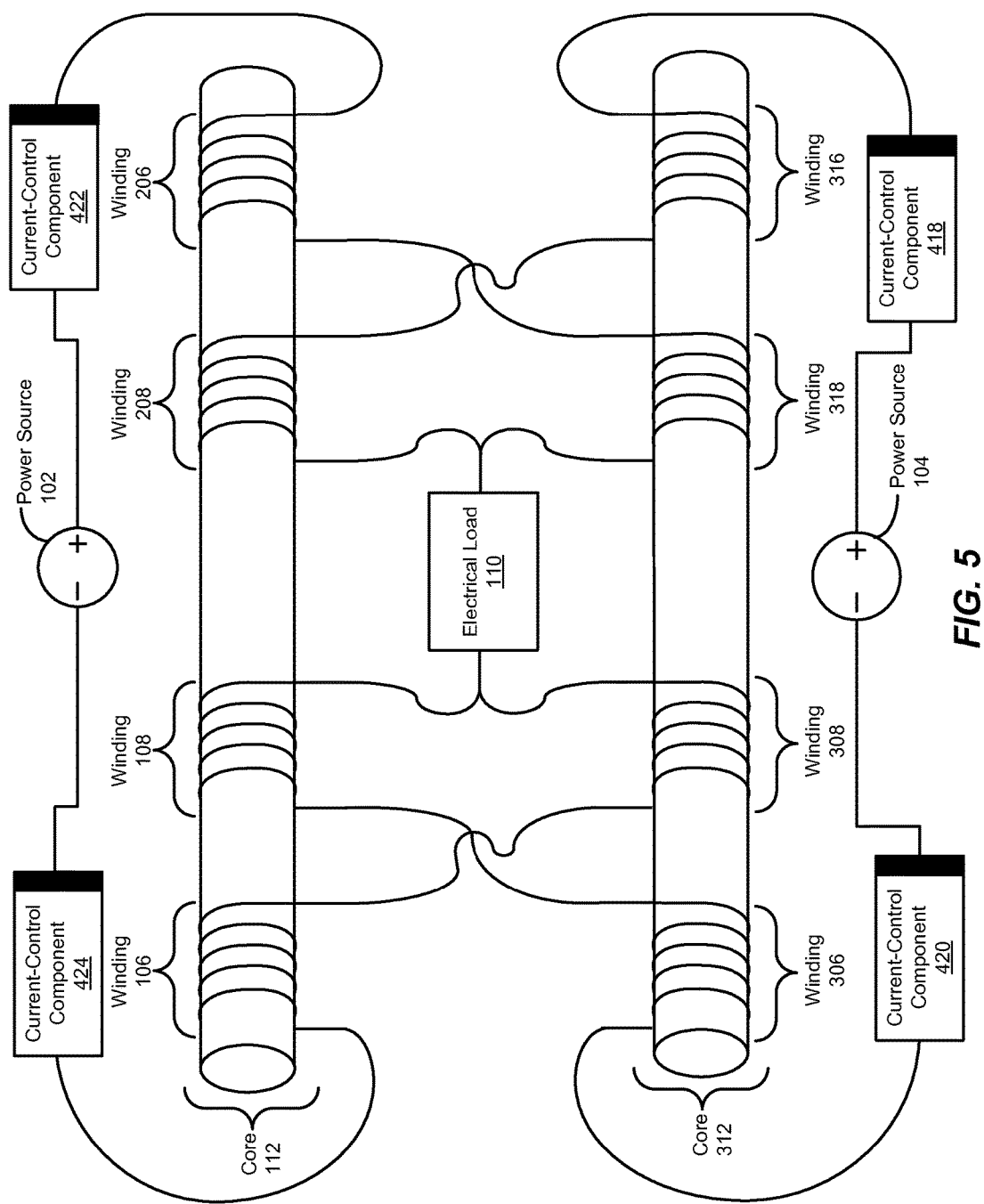
FIG. 5 is a block diagram of an exemplary redundant power system that includes an apparatus for reducing EMI in redundant power systems.

FIG. 5 shows an exemplary layout of the redundant power system shown in FIG. 4. In this layout, windings 106, 108, 206, and 208 may each be wound around a linear core 112 of inductor 114. Similarly, windings 306, 308, 316, and 318 may each be wound around a linear core 312 of inductor 314.

Figure 6:
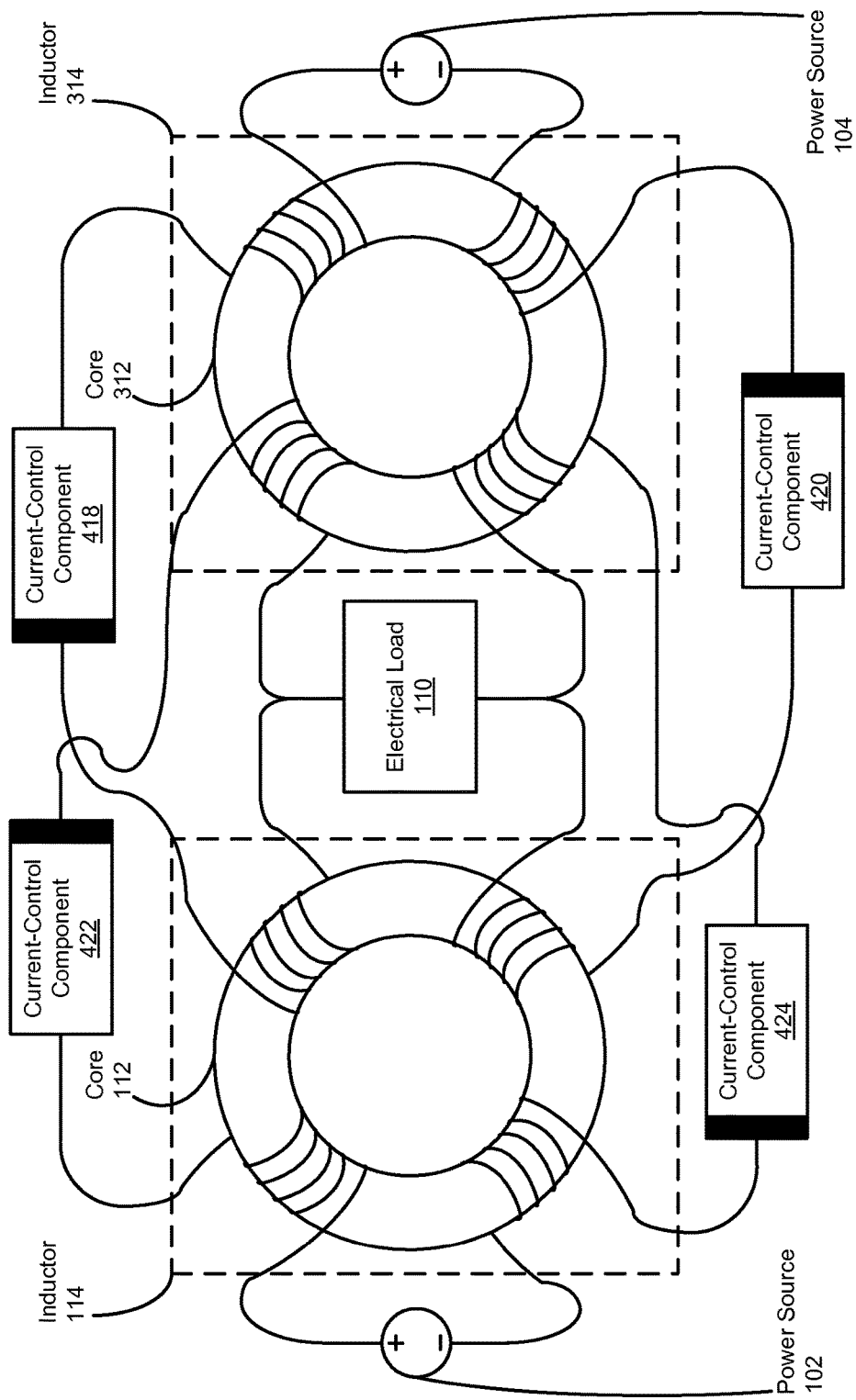
FIG. 6 is a block diagram of an exemplary redundant power system that includes an apparatus for reducing EMI.

FIG. 6 shows another exemplary layout of the redundant power system shown in FIG. 4. In this other layout, windings 106, 108, 206, and 208 may each be wound around a toroidal core 112 of inductor 114. Similarly, windings 306, 308, 316, and 318 may each be wound around a toroidal core 312 of inductor 314.

Figure 7:
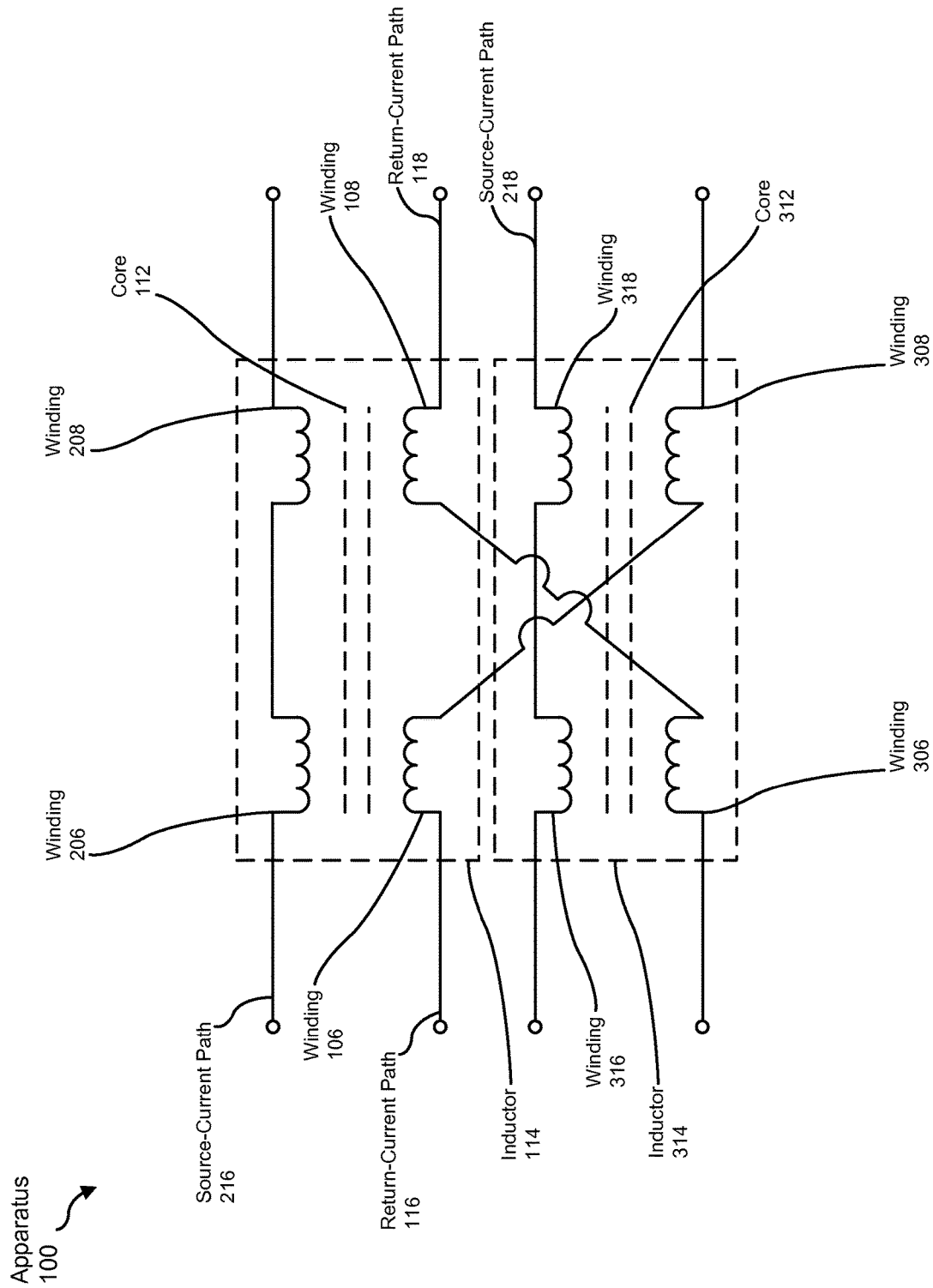
FIG. 7 is a block diagram of an exemplary apparatus for reducing EMI in redundant power systems.

FIG. 7 shows a schematic of apparatus 100 being implemented in a configuration where only return-current paths 116 and 118 cross between inductors 114 and 314. As shown in this configuration, return-current path 116 may include winding 106 wound around core 112 of inductor 114 as well as winding 308 wound around core 312 of inductor 314. Similarly, return-current path 118 may include winding 108 wound around core 112 of inductor 114 as well as winding 306 wound around core 312 of inductor 314.

In contrast, neither of source-current paths 216 and 218 may cross between inductors 114 and 314 in this configuration. For example, source-current path 216 may include only windings 206 and 208 wound around core 112 of inductor 114. Similarly, source-current path 218 may include only windings 316 and 318 wound around core 312 of inductor 314.

Figure 8:
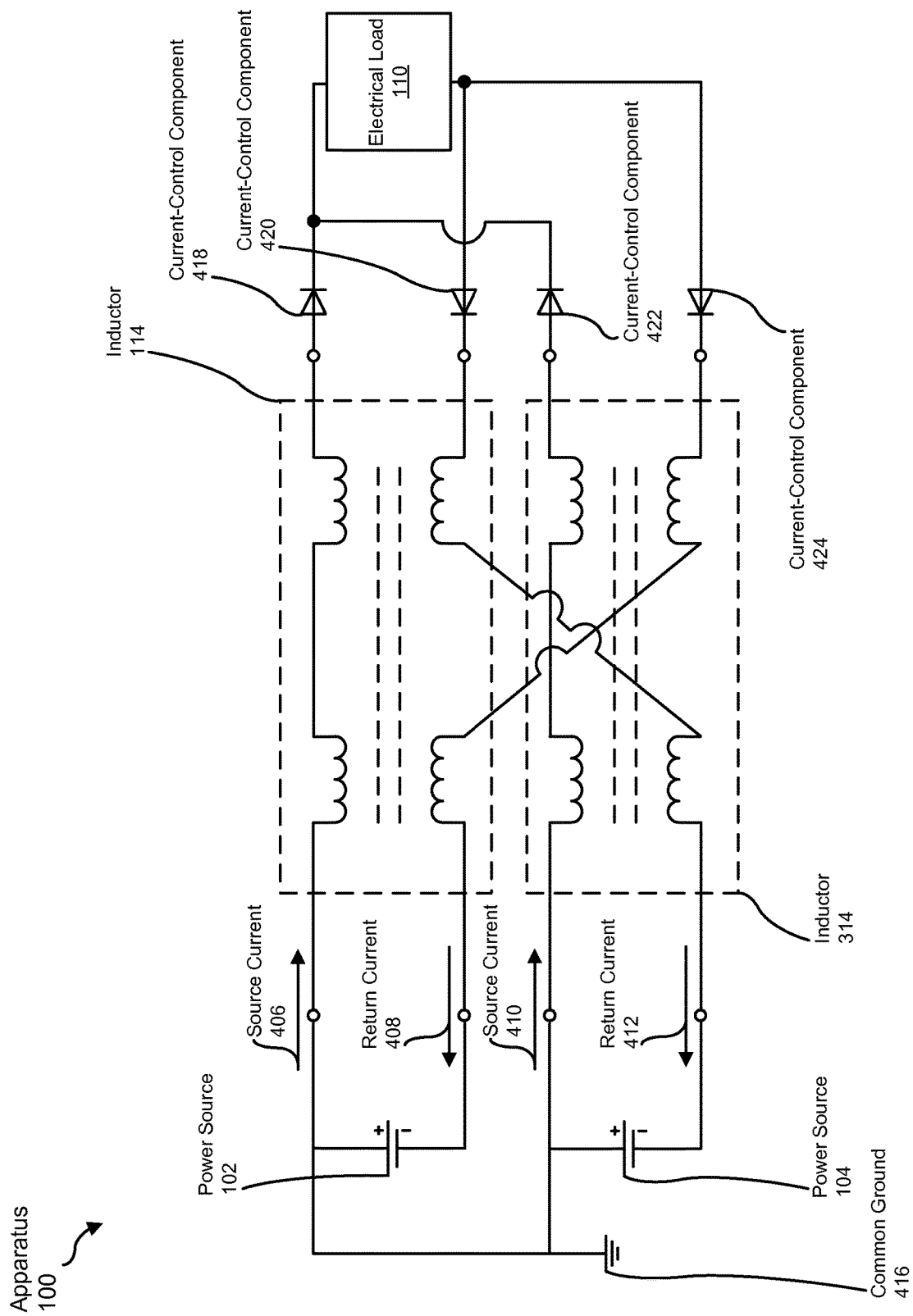
FIG. 8 is a block diagram of an exemplary redundant power system that includes an apparatus for reducing EMI.

FIG. 8 shows a schematic of an exemplary redundant power system that includes apparatus 100 in the configuration shown in FIG. 7. As shown in this schematic, power source 102 may provide source current 406 to electrical load 110 via source-current path 216 that includes windings 206 and 208. Similarly, power source 104 may provide source current 410 to electrical load 110 via source-current path 218 that includes windings 316 and 318.

In addition, power source 102 may receive return current 408 from electrical load 110 via return-current path 116 that includes windings 106 and 308. Similarly, power source 104 may receive return current 412 from electrical load 110 via return-current path 118 that includes windings 108 and 306.

Figure 9:
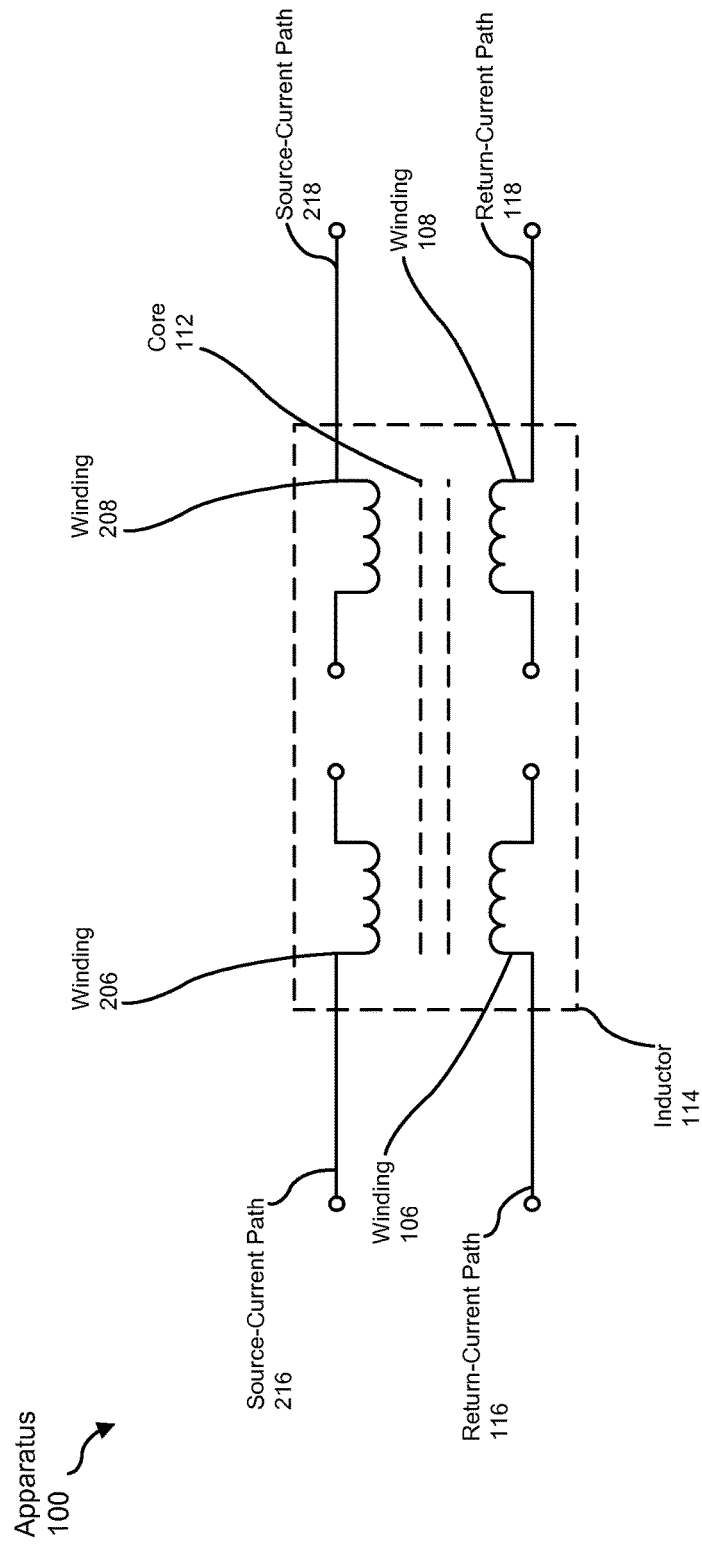
FIG. 9 is a block diagram of an exemplary apparatus for reducing EMI in redundant power systems.

FIG. 9 shows a schematic of apparatus 100 being implemented in a configuration that includes a single inductor 114. As shown in FIG. 9, return-current path 116 may include only winding 106 wound around core 112 of inductor 114. Similarly, return-current path 118 may include only winding 108 wound around core 112 of inductor 114.

In addition, source-current path 216 may include only winding 206 wound around core 112 of inductor 114. Similarly, source-current path 218 may include only winding 208 wound around core 112 of inductor 114.

Figure 10:
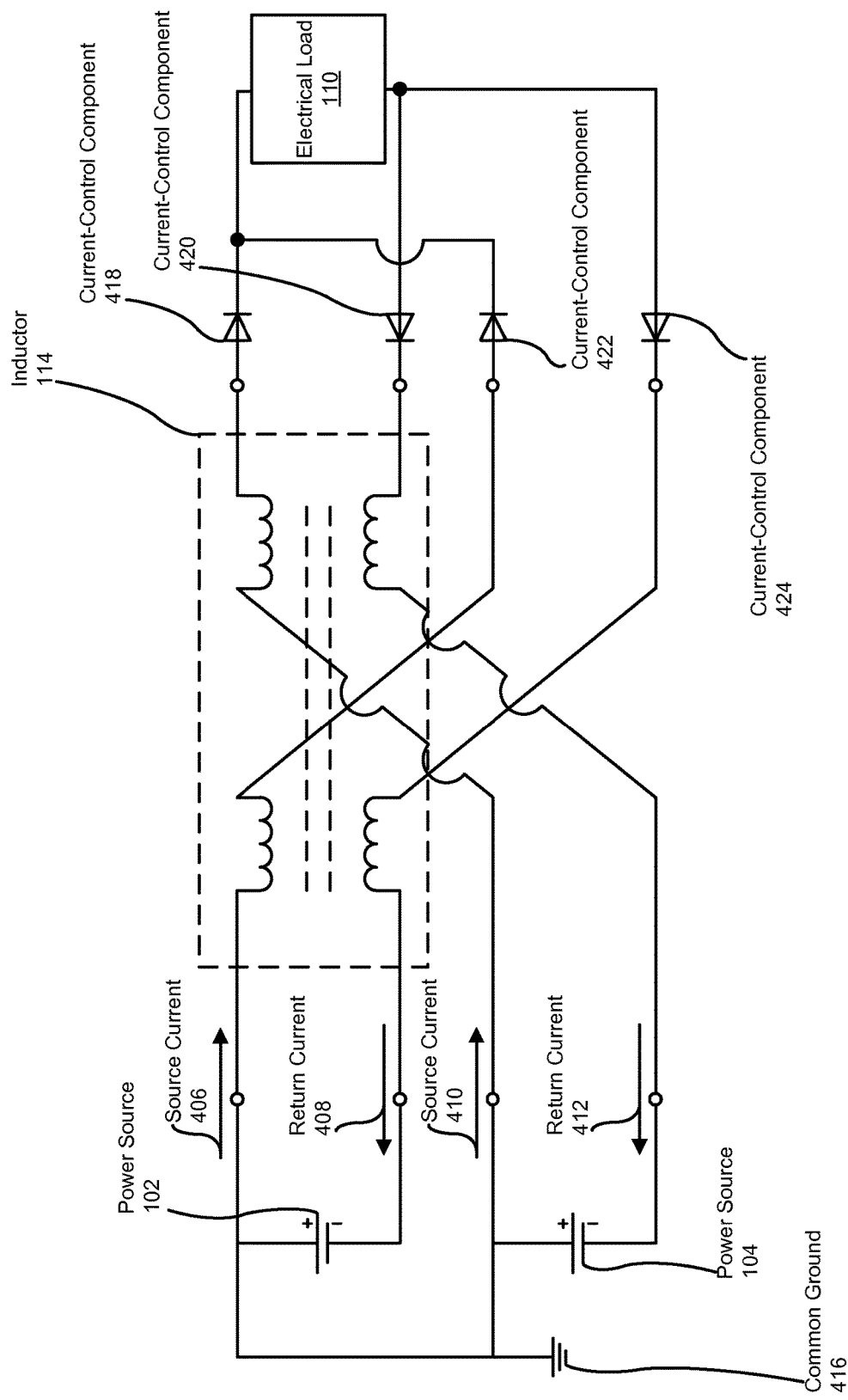
FIG. 10 is a block diagram of an exemplary redundant power system that includes an apparatus for reducing EMI.

FIG. 10 shows a schematic of an exemplary redundant power system that includes apparatus 100 in the configuration shown in FIG. 9. As shown in this schematic, power source 102 may provide source current 406 to electrical load 110 via source-current path 216 that includes winding 206. Similarly, power source 104 may provide source current 410 to electrical load 110 via source-current path 218 that includes winding 208.

In addition, power source 102 may receive return current 408 from electrical load 110 via return-current path 116 that includes winding 106. Similarly, power source 104 may receive return current 412 from electrical load 110 via return-current path 118 that includes winding 108.

While FIGS. 1-10 show a variety of electrical components and configurations that may help reduce EMI in redundant power systems, embodiments of the instant disclosure are not limited to the electrical components and configurations illustrated in FIGS. 1-10. For example, apparatus 100 may include one or more capacitors (sometimes referred to as "X" capacitors) electrically coupled in parallel with one or more of power sources 102 and 104. Additionally or alternatively, apparatus 100 may include one or more capacitors (sometimes referred to as "Y" capacitors) electrically coupled between each input terminal of power sources 102 and 104 and common ground 416.

Figure 11:
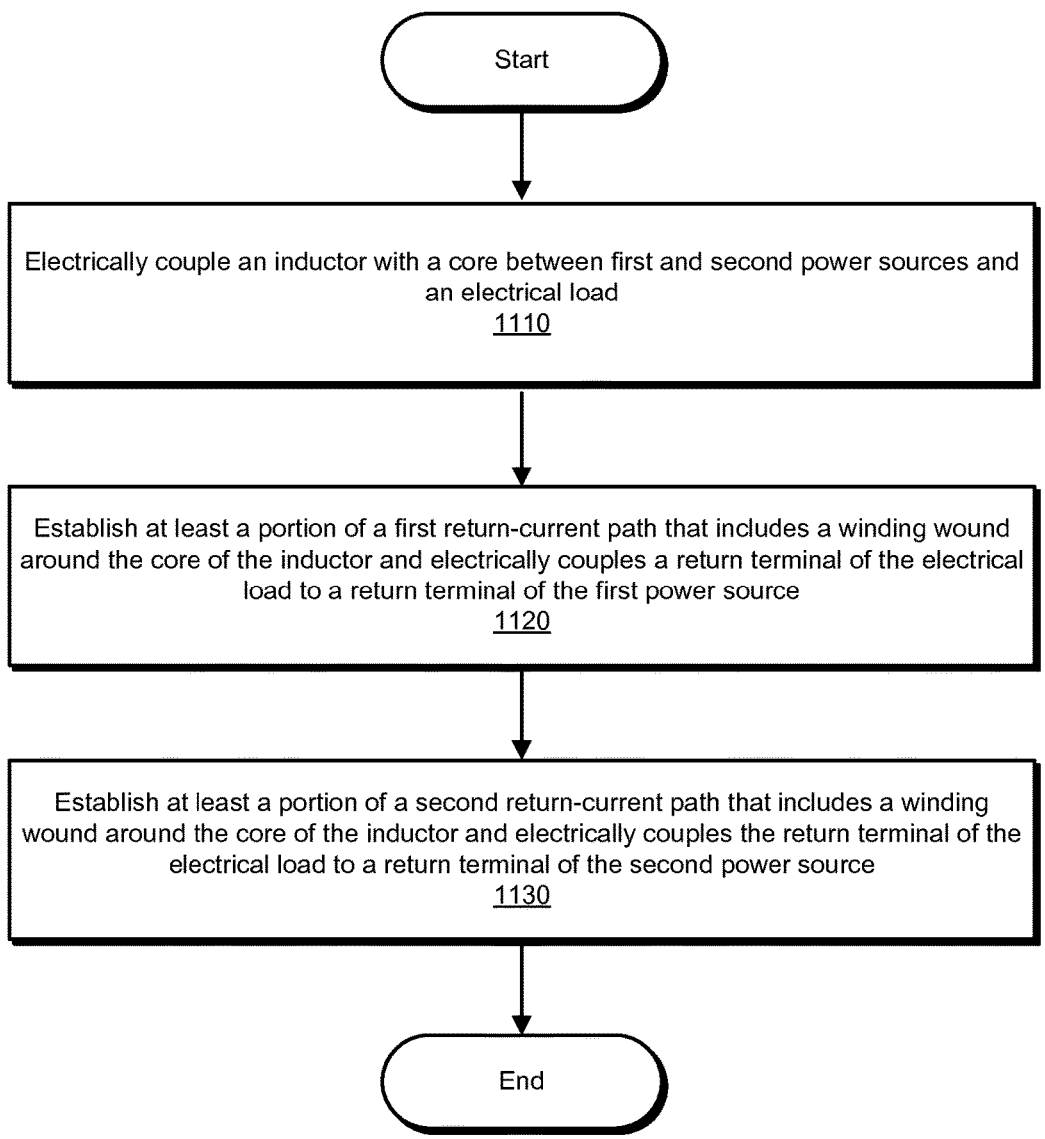
FIG. 11 is a flow diagram of an exemplary method for reducing EMI in redundant power systems.

FIG. 11 is a flow diagram of an exemplary method 1100 for reducing EMI in redundant power systems. Method 1100 may include the step of electrically coupling an inductor with a core between first and second power sources and an electrical load (1110). This electrical-coupling step may be performed in a variety of ways. In one example, the step may be performed by physically connecting inductor 114 between power sources 102 and 104 and electrical load 110. For example, a telecommunications equipment manufacturer may manufacture a printed circuit board (PCB) for a telecommunications device that is redundantly powered by power sources 102 and 104. When manufacturing the PCB, the telecommunications equipment manufacturer may assemble the telecommunications device by physically connecting inductor 114 between power sources 102 and 104 and electrical load 110.

Additionally or alternatively, step 1110 may be performed by powering on power sources 102 and 104 connected to electrical load 110 via inductor 114. For example, a user or automated system may power on power sources 102 and 104 to begin using the telecommunications device. This process of powering on the telecommunications device may cause inductor 114 to electrically couple power sources 102 and 104 to electrical load 110.

Returning to FIG. 11, method 1100 may also include the step of establishing at least a portion of a first return-current path that electrically couples a return terminal of the electrical load to a return terminal of the first power source (1120). The first return-current path may include a winding wound around the core of the inductor. This establishing step may be performed in a variety of ways. In one example, the step may be performed by physically connecting the return terminal of electrical load 110 to the return terminal of power source 102 via winding 106 of inductor 114. For example, the telecommunications equipment manufacturer may establish return-current path 116 by physically connecting the return terminal of electrical load 110 to the return terminal of power source 102 via winding 106 of inductor 114 during assembly of the telecommunications device.

Additionally or alternatively, step 1120 may be performed by enabling return current 408 to flow from electrical load 110 to power source 102 via winding 106 of inductor 114. For example, a user or automated system may establish return-current path 116 by enabling return current 408 to flow from electrical load 110 to power source 102 via winding 106 of inductor 114. The user or automated system may enable return current 408 to flow in this way by powering on the telecommunications device.

Returning to FIG. 11, method 1100 may also include the step of establishing at least a portion of a second return-current path that electrically couples the return terminal of the electrical load to a return terminal of the second power source (1130). The second return-current path may include a winding wound around the core of the inductor. This establishing step may be performed in a variety of ways. In one example, the step may be performed by physically connecting the return terminal of electrical load 110 to the return terminal of power source 104 via winding 108 of inductor 114. For example, a telecommunications equipment manufacturer may establish return-current path 118 by physically connecting the return terminal of electrical load 110 to the return terminal of power source 104 via winding 108 of inductor 114 during assembly of the telecommunications device.

Additionally or alternatively, step 1130 may be performed by enabling return current 412 to flow from electrical load 110 to power source 104 via winding 106 of inductor 114. For example, a user or automated system may establish return-current path 116 by enabling return current 412 to flow from electrical load 110 to power source 104 via winding 106 of inductor 114. The user or automated system may enable return current 412 to flow in this way by powering on the telecommunications device.

Method 1100 may also include one or more additional steps not illustrated in FIG. 11. For example, method 1100 may include the step of grounding the first and second power sources with a common ground. This grounding step may be performed in a variety of ways. In one example, the grounding step may be performed by physically connecting the source terminal of power source 102 to the source terminal of power source 104. For example, the telecommunications equipment manufacturer may ground power sources 102 and 104 with common ground 416 by physically connecting the source terminal of power source 102 to the source terminal of power source 104 during the process of manufacturing the PCB.

Additionally or alternatively, the grounding step may be performed by physically connecting the source terminal of power source 102 and the source terminal of power source 104 to Earth ground. For example, the user or automated system may plug or otherwise connect the telecommunications device into a power outlet prior to powering on the telecommunications device. By connecting the telecommunications device to a power grid, the user or automated system may physically connect both the source terminal of power source 102 and the source terminal of power source 104 to Earth ground.

In some examples, the grounding step may cause source currents 406 and 410 to have substantially the same magnitude. For example, common ground 416 may cause source currents 406 and 410 to each have a magnitude of approximately 5 amperes (amps). As a result, the sum of source currents 406 and 410 may reach a collective magnitude of approximately 10 amps at electrical load 110.

In some examples, the grounding step may cause source currents 406 and 410 to maintain substantially the same magnitude even though the voltage drop of power source 104 is at least slightly smaller than the voltage drop of power source 102. For example, common ground 416 may cause both of source currents 406 and 410 to maintain a magnitude of approximately 5 amps even though power source 102 has a voltage drop of approximately −54 volts and power source 104 has a voltage drop of approximately −48 volts relative to common ground 416.

Since, in this example, the voltage drop of power source 102 is at least slightly larger than the voltage drop of power source 104, power source 102 may pull the vast majority of the current passing through electrical load 110. For example, the larger −54 volt drop of power source 102 may cause return current 408 to have a magnitude that is substantially equal to the sum of source currents 406 and 410. In other words, return current 408 may equal approximately 10 amps.

In contrast, since the voltage drop of power source 104 is at least slightly larger than the voltage drop of power source 102, power source 104 may pull very little of the current passing through electrical load 110. For example, the smaller −48 volt drop of power source 104 may cause return current 412 to have a magnitude that is substantially negligible. In other words, return current 412 may equal approximately 0 amps.

In some examples, method 1100 may balance the core of the inductor such that the return currents collectively offset the source currents relative to the core. In one example, core 112 of inductor 114 may reach a state of equilibrium by enabling return currents 408 and 412 to collectively offset source currents 406 and 410. For example, in the event that return currents 408 and 412 collectively equal approximately 10 amps flowing away from electrical load 110 and source currents 406 and 410 collectively equal approximately 10 amps flowing toward electrical load 110, return currents 408 and 412 may collectively offset source currents 406 and 410 relative to core 112. In other words, return currents 408 and 412 may collectively cancel out source currents 406 and 410 relative to core 112.

Additionally or alternatively, method 1100 may reduce EMI created by electrical load 110 by balancing the magnetic flux of inductor 114. In one example, core 112 of inductor 114 may reach a state of equilibrium by enabling the magnetic flux induced at windings 206 and 208 to collectively offset the magnetic flux induced at windings 106 and 108. For example, source currents 406 and 410 may induce magnetic flux along source-current paths 216 and 218 at windings 206 and 208, respectively. Similarly, return currents 408 and 412 may induce magnetic flux along return-current paths 116 and 118 at windings 106 and 108, respectively.

In the event that return currents 408 and 412 collectively equal source currents 406 and 410, the magnitude of the magnetic flux induced at windings 106 and 108 may collectively equal the magnitude of the magnetic flux induced at windings 206 and 208. However, since return currents 408 and 412 and source currents 406 and 410 are flowing in opposing directions, the magnetic flux induced at windings 106 and 108 and the magnetic flux induced at windings 206 and 208 may have opposing directions. As a result, the magnetic flux induced at windings 106 and 108 may collectively offset the magnetic flux induced at windings 206 and 208. In other words, the magnetic flux induced at windings 106 and 108 may collectively cancel out the magnetic flux induced at windings 206 and 208 such that the net magnetic flux of inductor 114 is approximately 0 webers.

Since, in this example, the magnetic flux induced at windings 106 and 108 has collectively cancelled out the magnetic flux induced at windings 206 and 208, the magnetic flux induced at winding 106 may fail to create any substantial magnetizing current. In other words, the magnetic flux induced at winding 106 may fail to substantially increase return current 408. The phrase "magnetizing current," as used herein, generally refers to any type or form of electrical current that results from a change in magnetic flux.

Moreover, since the net magnetic flux of inductor 114 is approximately 0 webers and the magnetic flux induced by return current 408 has failed to create any substantial magnetizing current, return current 408 may fail to saturate core 112 of inductor 114. As a result, inductor 114 may be able to reject (or at least sufficiently reduce) EMI created by electrical load 110, thereby enabling electrical load 110 to function properly and maintain a high level of reliability and/or performance.

As explained above, embodiments of the instant disclosure may balance the magnetic flux induced by inductors that serve as EMI filters in redundant power systems. In other words, these embodiments may enable the magnetic flux induced by the individual windings of each inductor to collectively offset one another such that the inductor avoids creating magnetizing current that saturates the inductor's core.

By enabling the magnetic flux induced by the individual windings of each inductor to collectively offset one another, embodiments of the instant disclosure may facilitate the usage of high magnetic permeability material (such as ferromagnetic material) in the inductor's core without the risk of saturation. Moreover, by facilitating the usage of high magnetic permeability material in the inductor's core without the risk of saturation, these embodiments may enable the inductors to achieve higher inductance within smaller physical dimensions. As a result, these embodiments may help to reduce the amount of circuit board area needed to accommodate EMI filters, improve air cooling, and/or increase the reliability of electrical equipment (such as telecommunications devices) powered by redundant power sources.

Figure 12:
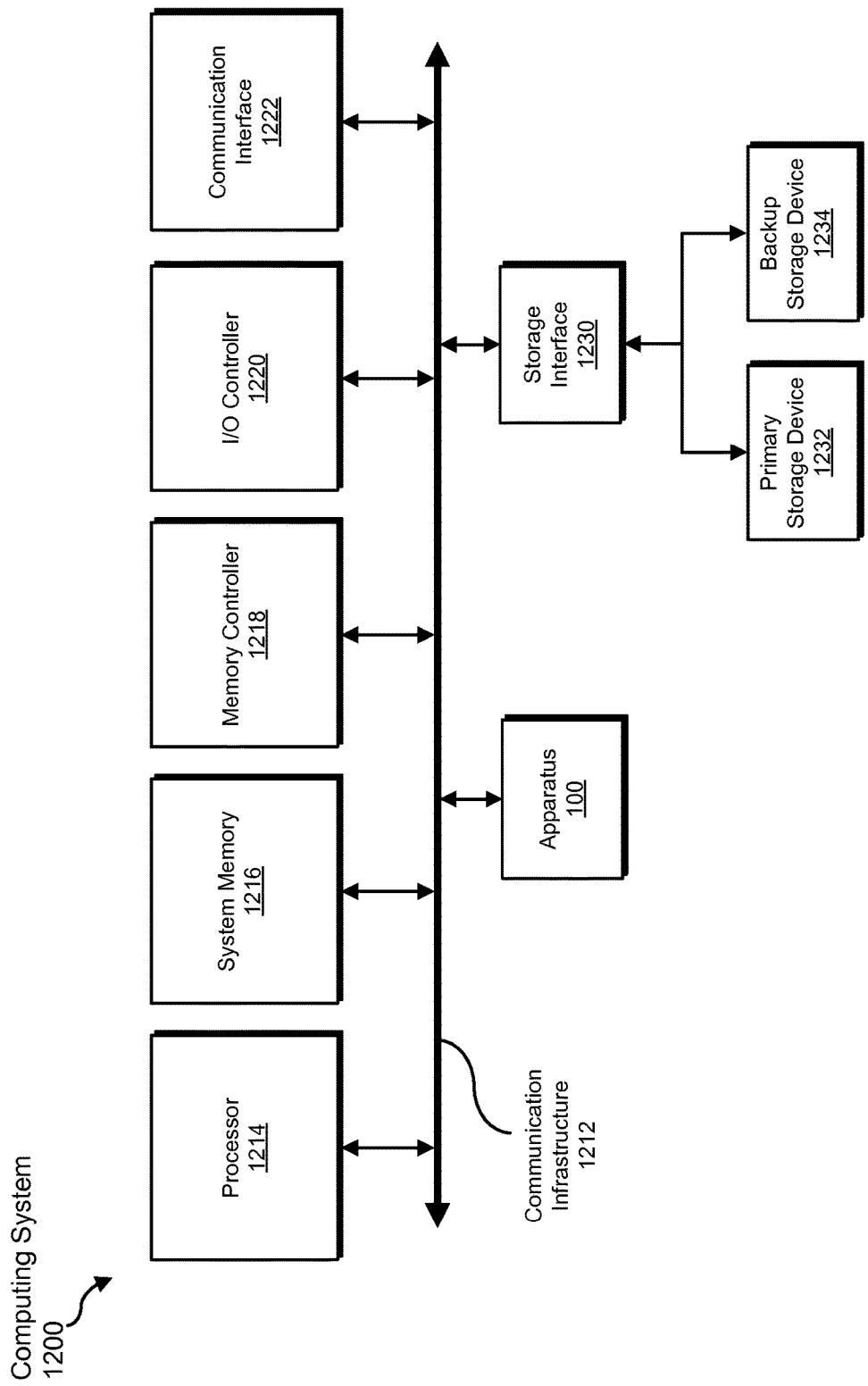
FIG. 12 is a block diagram of an exemplary computing system capable of implementing and/or being used in connection with one or more of the embodiments described and/or illustrated herein.

FIG. 12 is a block diagram of an exemplary computing system 1200 capable of implementing and/or being used in connection with one or more of the embodiments described and/or illustrated herein. In some embodiments, all or a portion of computing system 1200 may perform and/or be a means for performing, either alone or in combination with other elements, one or more of the steps described in connection with FIG. 11. All or a portion of computing system 1200 may also perform and/or be a means for performing and/or implementing any other steps, methods, or processes described and/or illustrated herein.

In one example, although not illustrated in FIG. 12, power sources 102 and 104 may be configured to provide redundant power to computing system 1200. In addition, although not illustrated in FIG. 12, apparatus 100 may be electrically coupled between power sources 102 and 104 and computing system 1200. In this example, apparatus 100 may reduce EMI created by computing system 1200 while power sources 102 and 104 provide redundant power to computing system 1200.

Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. Processor 1214 may represent an application-specific integrated circuit (ASIC), a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other processing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations.

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and I/O controller 1220 via communication infrastructure 1212. In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   an inductor capable of being electrically coupled between first and second power sources and an electrical load, the inductor comprising a core;
   a first return-current path that electrically couples a return terminal of the electrical load to a return terminal of the first power source, the first return-current path comprising a first winding wound around the core of the inductor in a specific direction;
   a second return-current path that electrically couples the return terminal of the electrical load to a return terminal of the second power source, the second return-current path comprising a second winding wound around the core of the inductor in the same specific direction;
   a first source-current path that electrically couples a source terminal of the first power source to a source terminal of the electrical load, the first source-current path comprising a third winding wound around the core of the inductor in the same specific direction; and
   a second source-current path that electrically couples a source terminal of the second power source to the source terminal of the electrical load, the second source-current path comprising a fourth winding wound around the core of the inductor in the same specific direction.

2. The apparatus of claim 1, further comprising an additional inductor capable of being electrically coupled between the first and second power sources and the electrical load, the additional inductor comprising an additional core, wherein the first return-current path further comprises a winding wound around the additional core of the additional inductor and the second return-current path further comprises a winding wound around the additional core of the additional inductor.

3. The apparatus of claim 2, further comprising:
   a first source-current path that electrically couples a source terminal of the first power source to a source terminal of the electrical load, the first source-current path further comprising a winding wound around the additional core of the additional inductor; and
   a second source-current path that electrically couples a source terminal of the second power source to the source terminal of the electrical load, the second source-current path further comprising and a winding wound around the additional core of the additional inductor.

4. The apparatus of claim 1, further comprising:
   a current-control component that is electrically coupled between the first winding wound around the core of the inductor in the first return-current path and the return terminal of the electrical load, wherein the current-control component is configured to prevent current from flowing toward the electrical load via the first return-current path; and
   an additional current-control component electrically coupled between the second winding wound around the core of the inductor in the second return-current path and the return terminal of the electrical load, wherein the additional current-control component is configured to prevent current from flowing toward the electrical load via the second return-current path.

5. The apparatus of claim 1, wherein the first and second power sources are grounded by a common ground.

6. The apparatus of claim 1, wherein each winding wound around the core of the inductor has the same number of turns as every other winding wound around the core of the inductor.

7. The apparatus of claim 1, wherein the core of the inductor comprises a ferromagnetic core.

8. The apparatus of claim 1, wherein the inductor comprises a common-mode choke.

9. A method comprising:
   electrically coupling an inductor with a core between first and second power sources and an electrical load by:
      establishing at least a portion of a first return-current path that electrically couples a return terminal of the electrical load to a return terminal of the first power source, the first return-current path comprising a first winding wound around a core of the inductor in a specific direction;
      establishing at least a portion of a second return-current path that electrically couples the return terminal of the electrical load to a return terminal of the second power source, the second return-current path comprising a second winding wound around the core of the inductor in the same specific direction;
      establishing a first source-current path that electrically couples a source terminal of the first power source to a source terminal of the electrical load, the first source-current path comprising a third winding wound around the core of the inductor in the same specific direction; and establishing a second source-current path that electrically couples a source terminal of the second power source to the source terminal of the electrical load, the second source-current path comprising a fourth winding wound around the core of the inductor in the same specific direction.

10. The method of claim 9, further comprising grounding the first and second power sources with a common ground such that:

the first power source provides source current to the electrical load via the first source-current path; and the second power source provides additional source current having substantially the same magnitude as the source current to the electrical load via the second source-current path.

11. The method of claim 10, wherein:

grounding the first and second power sources with the common ground comprises:

causing a first voltage drop across the source and return terminals of the first power source;

causing a second voltage drop that is at least slightly smaller than the first voltage drop across the source and return terminals of the second power source such that:

the first power source receives return current that is substantially equal to a sum of the source current and the additional source current via the first return-current path; and the second power source receives additional return current that is substantially negligible via the second return-current path; and electrically coupling the inductor between the first and second power sources and the electrical load comprises balancing the core of the inductor by enabling the return current and the additional return current to collectively offset the source current and the additional source current relative to the core of the inductor.

12. The method of claim 9, wherein electrically coupling the inductor between the first and second power sources and the electrical load comprises:

inducing source-path magnetic flux at the third winding wound around the core of the inductor in the first source-current path;

inducing return-path magnetic flux at the first winding wound around the core of the inductor in the first return-current path;

inducing additional source-path magnetic flux at the fourth winding wound around the core of the inductor in the second source-current path; and inducing additional return-path magnetic flux at the second winding wound around the core of the inductor in the second return-current path.

13. The method of claim 12, wherein electrically coupling the inductor between the first and second power sources and the electrical load comprises reducing electromagnetic interference created by the electrical load by enabling the source-path magnetic flux and the additional source-path magnetic flux to collectively offset the return-path magnetic flux and the additional return-path magnetic flux such that:

the return-path magnetic flux does not substantially increase return current flowing through the first return-current path; and the return current does not saturate the core of the inductor.

14. A system comprising:

first and second power sources that provide redundant power to an electrical load;

an electromagnetic interference filter electrically coupled between the first and second power sources and the electrical load, wherein the electromagnetic interference filter comprises:

an inductor with a core;

a first return-current path that electrically couples a return terminal of the electrical load to a return terminal of the first power source, the first return-current path comprising a first winding wound around the core of the inductor in a specific direction;

a second return-current path that electrically couples the return terminal of the electrical load to a return terminal of the second power source, the second return-current path comprising a second winding wound around the core of the inductor in the same specific direction;

a first source-current path that electrically couples a source terminal of the first power source to a source terminal of the electrical load, the first source-current path comprising a third winding wound around the core of the inductor in the same specific direction; and a second source-current path that electrically couples a source terminal of the second power source to the source terminal of the electrical load, the second source-current path comprising a fourth winding wound around the core of the inductor in the same specific direction.

15. The system of claim 14, wherein:

the electromagnetic interference filter further comprises:

an additional inductor with an additional core;

a first source-current path that electrically couples a source terminal of the first power source to a source terminal of the electrical load, the first source-current path comprising a winding wound around the additional core of the additional inductor; and a second source-current path that electrically couples a source terminal of the second power source to the source terminal of the electrical load, the second source-current path comprising a winding wound around the additional core of the additional inductor;

the first return-current path further comprises a winding wound around the additional core of the additional inductor; and the second return-current path further comprises a winding wound around the additional core of the additional inductor.

16. The system of claim 14, wherein the electrical load comprises at least one telecommunications device redundantly powered by the first and second power sources.

* * * * *